(12) United States Patent
Fan

(10) Patent No.: US 11,218,075 B2
(45) Date of Patent: Jan. 4, 2022

(54) TRANSIENT RESPONSE CIRCUIT OF SWITCHING REGULATOR

(71) Applicant: AMLOGIC (SHANGHAI) CO., LTD., Shanghai (CN)

(72) Inventor: Mao Fan, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 525 days.

(21) Appl. No.: 16/342,081

(22) PCT Filed: Nov. 12, 2018

(86) PCT No.: PCT/CN2018/115060
§ 371 (c)(1),
(2) Date: Apr. 15, 2019

(87) PCT Pub. No.: WO2019/120006
PCT Pub. Date: Jun. 27, 2019

(65) Prior Publication Data
US 2021/0359603 A1   Nov. 18, 2021

(30) Foreign Application Priority Data

Dec. 19, 2017   (CN) .......................... 201711376699.1
Dec. 19, 2017   (CN) .......................... 201711377937.0

(51) Int. Cl.
*H02M 3/158*   (2006.01)
*H02M 1/00*   (2006.01)
(Continued)

(52) U.S. Cl.
CPC ............ *H02M 3/158* (2013.01); *G05F 1/565* (2013.01); *H02M 1/0003* (2021.05); *G05F 1/575* (2013.01)

(58) Field of Classification Search
CPC .... H02M 1/00; H02M 1/0003; H02M 1/0009; H02M 1/0016; H02M 1/0019;
(Continued)

(56) References Cited

U.S. PATENT DOCUMENTS 5,481,178 A * 1/1996 Wilcox ............... H02M 3/1588
323/287
5,600,234 A * 2/1997 Hastings ................. G05F 1/575
323/282
(Continued)

FOREIGN PATENT DOCUMENTS

CN   104052281 A   9/2014
CN   203827178 U   9/2014
(Continued)

OTHER PUBLICATIONS

PCT/CN2018/115060, Search Report and Written Opinion dated Jan. 30, 2019, 9 pages—Chinese, 7 pages—English.

*Primary Examiner* — Jue Zhang
*Assistant Examiner* — David A. Singh
(74) *Attorney, Agent, or Firm* — Andrew F. Young; Nolte Lackenbach Siegel

(57) ABSTRACT

A switching regulator has a voltage reduction module, a first acquisition module, a second acquisition module, a third acquisition module, a comparison module and a pulse width modulation module, wherein the comparison module compares a superposed signal of a flat-wave signal or a ramp signal and a feedback signal with an acquisition signal, and outputs a comparison signal; the second acquisition module outputs the ramp signal when the acquired output signal is greater than a preset value, otherwise outputs the flat-wave signal; or when the working current obtained from the main circuit is greater than a preset value, a ratio of the feedback signal output from the third acquisition module to the working current of the main circuit is 1, otherwise the ratio
(Continued)

is less than 1. The switching regulator has the advantages of excellent transient response, quick response, and high reliability.

9 Claims, 3 Drawing Sheets

(51) Int. Cl.
*G05F 1/565* (2006.01)
*G05F 1/575* (2006.01)

(58) Field of Classification Search
CPC ............ H02M 1/0025; H02M 1/0048; H02M 1/0054; H02M 1/0067; H02M 1/007; H02M 1/0083; H02M 1/08; H02M 1/088; H02M 1/14; H02M 1/143; H02M 1/15; H02M 1/42; H02M 1/4208; H02M 1/4225; H02M 1/4233; H02M 1/4291; H02M 3/02; H02M 3/04; H02M 3/10; H02M 3/145; H02M 3/155; H02M 3/1555; H02M 3/156; H02M 3/158; H02M 3/1582; G05F 1/10; G05F 1/46; G05F 1/56; G05F 1/563; G05F 1/565; G05F 1/569; G05F 1/571; G05F 1/573; G05F 1/5735; G05F 1/575; G05F 1/59; G05F 1/595

See application file for complete search history.

(56) References Cited

U.S. PATENT DOCUMENTS

| | | | | |
|---|---|---|---|---|
| 6,366,070 | B1 * | 4/2002 | Cooke | H02M 3/1588 323/284 |
| 7,245,113 | B2 * | 7/2007 | Chen | H02M 3/1588 323/271 |
| 2004/0095101 | A1 * | 5/2004 | Pidutti | H02M 1/4225 323/222 |
| 2005/0007167 | A1 * | 1/2005 | Tange | H03K 7/08 327/172 |
| 2007/0040537 | A1 * | 2/2007 | Low | H02M 3/1588 323/282 |
| 2009/0218999 | A1 * | 9/2009 | Kikuchi | H02M 3/156 323/282 |
| 2011/0109164 | A1 * | 5/2011 | Mohammed Suhura | H05B 47/165 307/66 |
| 2014/0266090 | A1 * | 9/2014 | Wei | H02M 3/156 323/271 |
| 2015/0180338 | A1 * | 6/2015 | Choi | H02M 3/1563 323/271 |
| 2016/0172974 | A1 * | 6/2016 | Teh | H02M 3/158 323/271 |

FOREIGN PATENT DOCUMENTS

| | | |
|---|---|---|
| CN | 105334900 A | 2/2016 |
| CN | 108306504 A | 7/2018 |
| CN | 108566073 A | 9/2018 |

* cited by examiner

TRANSIENT RESPONSE CIRCUIT OF SWITCHING REGULATOR

CROSS REFERENCE TO RELATED APPLICATIONS

This application relates to, and claims priority as a national phase application from Ser. No.: PCT/CN2018/115060 filed Nov. 12, 2018, the entire contents of which are incorporated herein by reference, and which in turn claims priority to and benefit of Chinese Patent App. Ser. No. CN201711377937.0 filed Dec. 19, 2107 and CN201711376699.1 filed Dec. 19, 2017.

FIGURE SELECTED FOR PUBLICATION

FIG. 1

BACKGROUND OF THE INVENTION

1. Field of the Invention

The invention relates to the field of power electronic technologies, and more particularly, to a transient response circuit of a switching regulator.

2. Description of the Related Art

With the rapid development of the microelectronic technologies, a switching regulator is widely used in various applications by virtue of its simple circuit structure, convenience to adjust and high reliability. The switching regulator is typically controlled by using PWM (Pulse Width Modulation), which has the advantage of reducing the noise effectively.

However, the switching regulator, controlled by PWM technology, is highly influenced by a load, and has poor performance of transient response, with the result that it cannot provide a sufficiently stable power for the load and leads to a larger possibility of power failure, thus, such a switching regulator has a poor reliability.

SUMMARY OF THE INVENTION

Aiming at the forgoing problems in the prior art, the present invention provides a transient response circuit of a switching regulator.

The technical solutions are as follows:

A transient response circuit of a switching regulator, comprising:

a voltage reduction module, comprising:

a signal input terminal for receiving an input signal and a signal output terminal for outputting an output signal;

a main circuit connected in series with the signal input terminal and the signal output terminal;

a first MOS transistor and a second MOS transistor for controlling on and off state of the main circuit;

a first acquisition module, connected to the signal output terminal, configured to acquire the output signal from the signal output terminal, and configured to output an acquisition signal based on the output signal;

a second acquisition module, connected to the signal output terminal, configured to acquire the output signal from the signal output terminal, and configured to output a gating signal based on the output signal, wherein the gating signal comprises a ramp signal and a flat-wave signal;

a third acquisition module, configured to acquire working current in the main circuit in the voltage reduction module and output a feedback signal;

a comparison module, comprising:

a positive phase input terminal, connected to the first acquisition module, and configured to receive the acquisition signal;

a first negative phase input terminal, connected to the second acquisition module, and configured to receive the gating signal;

a second negative phase input terminal, connected to the third acquisition module, and configured to receive the feedback signal;

a comparison output terminal;

wherein the comparison module compares a superposed signal of the flat-wave signal or the ramp signal and the feedback signal with the acquisition signal, and configured to output a comparison signal via the comparison output terminal;

a plurality of pulse width modulation modules, connected to the comparison output terminal, the first MOS transistor, and the second MOS transistor, respectively, and configured to receive the comparison signal and generate a control signal of corresponding duty cycle based on the comparison signal so as to control the first MOS transistor and the second MOS transistor;

wherein the second acquisition module outputs the ramp signal when the acquired output signal is greater than a preset value, and outputs the flat-wave signal when the output signal is less than the preset value; or when the working current in the main circuit is greater than a preset value, a ratio of the feedback signal output from the third acquisition module to the working current in the main circuit is 1; and when the working current in the main circuit is less than the preset value, a ratio of the feedback signal output from the third acquisition module to the working current in the main circuit is less than 1.

Preferably, a level of the flat-wave signal is 0.

Preferably, the preset value is 25% to 95% of a rated value of the working current in the main circuit.

Preferably, the preset value is half of a rated value of the working current in the main circuit.

Preferably, the first acquisition module comprises an error amplifying unit for amplifying the output signal after comparing the acquired output signal and a preset reference signal.

Preferably, the first acquisition unit comprises a voltage regulating unit, an input terminal of the voltage regulating unit is connected to an output port of the error amplifying unit for regulating a voltage of an amplified signal generated from the error amplifying unit, and thereby forming the acquisition signal.

Preferably, the voltage regulating unit comprises a first voltage regulating capacitor, a second voltage regulating capacitor, and a voltage regulating resistor;

wherein the first voltage regulating capacitor is connected in series with the voltage regulating resistor before it is connected in parallel with the second voltage regulating capacitor.

Preferably, the voltage reduction module comprises an induction resistor connected in series with the main circuit;

the third acquisition module acquires an induced voltage on the induction resistor, and multiplying the induced voltage by a feedback coefficient to generate the feedback signal.

Preferably, both the first MOS transistor and the second MOS transistor are NMOS transistors.

The above-mentioned technical solutions have the following beneficial effects. A transient response circuit of a switching regulator disclosed herein features excellent transient response, quick response, and high reliability.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
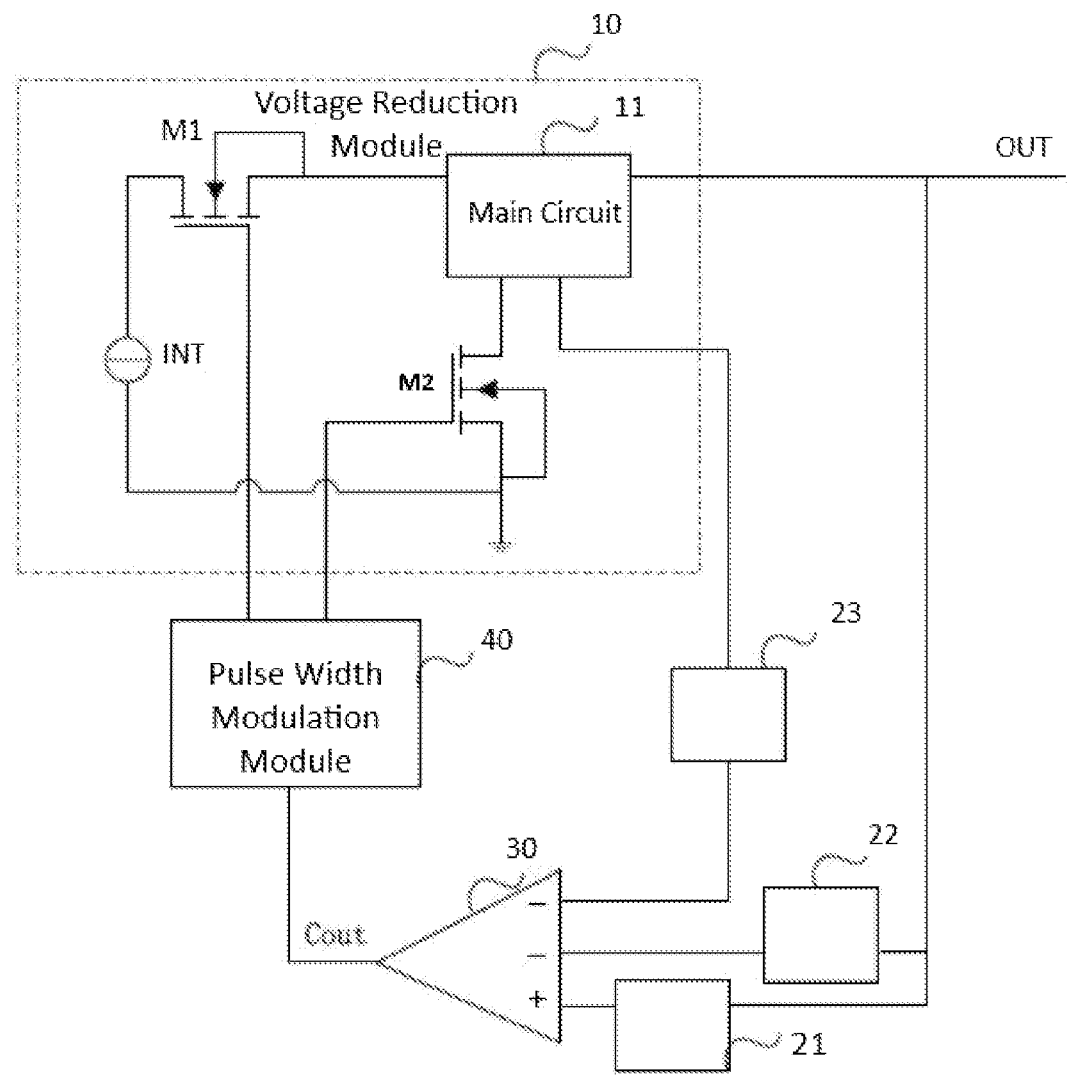
FIG. 1 is a schematic structural diagram of a transient response circuit of a switching regulator according to an embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "plurality" means a number greater than one.

Hereinafter, certain exemplary embodiments according to the present disclosure will be described with reference to the accompanying drawings.

The present invention discloses a transient response circuit of a switching regulator, comprising:

a voltage reduction module 10, comprising:

a signal input terminal IINT for receiving an input signal and a signal output terminal OUT for outputting an output signal;

a main circuit 11 connected in series with the signal input terminal INT and the signal output terminal OUT;

a first MOS transistor M1 and a second MOS transistor M2 for controlling on and off state of the main circuit 11;

a first acquisition module 21, connected to the signal output terminal, configured to acquire the output signal from the signal output terminal, and configured to output an acquisition signal based on the output signal;

a second acquisition module 22, connected to the signal output terminal OUT, configured to acquire the output signal from the signal output terminal OUT, and configured to output a gating signal based on the output signal, wherein the gating signal comprises a ramp signal or a flat-wave signal;

a third acquisition module 23, configured to acquire working current in the main circuit 11 in the voltage reduction module 10 and output a feedback signal;

when the working current in the main circuit 11 is greater than a preset value, a ratio of the feedback signal output from the third acquisition module 23 to the working current in the main circuit 11 is 1; and when the working current in the main circuit 11 is less than the preset value, a ratio of the feedback signal output from the third acquisition module 23 to the working current in the main circuit 11 is less than 1;

a comparison module 30, comprising:

a positive phase input terminal, connected to the first acquisition module 21, and configured to receive the acquisition signal;

a first negative phase input terminal, connected to the second acquisition module 22, and configured to receive the gating signal;

a second negative phase input terminal, connected to the third acquisition module 23, and configured to receive the feedback signal;

a comparison output terminal Cout;

wherein the comparison module 30 compares a superposed signal of the flat-wave signal or the ramp signal and the feedback signal with the acquisition signal, and configured to output a comparison signal via the comparison output terminal Cout;

a plurality of pulse width modulation modules 40, connected to the comparison output terminal Cout, the first MOS transistor M1, and the second MOS transistor M2, respectively, and configured to receive the comparison signal and generate a control signal of corresponding duty cycle based on the comparison signal so as to control the first MOS transistor M1 and the second MOS transistor M2;

wherein the second acquisition module 22 outputs the ramp signal when the acquired output signal is greater than a preset value, and outputs the flat-wave signal when the output signal is less than the preset value; or when the working current in the main circuit is greater than a preset value, a ratio of the feedback signal output from the third acquisition module 23 to the working current in the main circuit 11 is 1; and when the working current in the main circuit 11 is less than the preset value, a ratio of the feedback signal output from the third acquisition module to the working current in the main circuit 11 is less than 1.

By adopting the above-mentioned technical solutions of transient response circuit of a switching regulator, as shown in FIG. 1, the first MOS transistor M1 and the second MOS transistor M2 are respectively connected to the main circuit 11 for performing a turn-on operation and a turn-off operation under the control of a control signal, thereby enabling the control of on and off state of the main circuit 11. Notably, the control signal is a pulse signal with a specific duty ratio, allowing the first MOS transistor M1 and the second MOS transistor M2 to be sequentially turned on during each period of time, thereby controlling the current/voltage in the main circuit though different duty cycles. However, this is a commonly used technical method for those skilled in the art and will not be described herein. Both the first MOS transistor M1 and the second MOS transistor M2 may be preferably NMOS transistors, however, other configurations are also acceptable, for example, both the first MOS transistor M1 and the second MOS transistor M2 are PMOS transistors, or one is a PMOS transistor, and the other is a NMOS transistor.

In the above-mentioned technical solution, the gating signal comprises a ramp signal or a flat-wave signal; specifically, when the acquired output signal is greater than a preset value, that is, a voltage/current signal at the signal output terminal OUT can be maintained above the preset value, the second acquisition module 22 outputs the ramp signal, thereby enabling the whole circuit to operate well; when the acquired output signal is less than a preset value, that is, a voltage/current signal at the signal output terminal OUT drops suddenly due to various factors, the second acquisition module 22 outputs the flat-wave signal, preferably a low level signal. In this way, a large proportion of the superposed signal is the feedback signal output from the third acquisition module 23, such that the comparison signal output from the comparison module 30 can be inverted easily then. Moreover, the control signal, outputted to the first MOS transistor M1 and the second MOS transistor M2 by the pulse width modulation module 40, has a larger duty cycle, which may facilitate the rapid recovery of the signal at the signal output terminal OUT of the voltage reduction module 10.

In this embodiment, preferably, a level of the flat-wave signal is 0.

Specifically, since the level value of the flat-wave signal is 0, this level value may be a voltage level value. The superimposed signal almost entirely comes from the feedback signal. In this case, the whole circuit may give a feedback about the disturbance to the largest extent, and the output signal at the signal output terminal OUT responses in a fastest way.

In the above-mentioned embodiment, when the working current in the main circuit is greater than a preset value, a ratio of the feedback signal output from the third acquisition module 23 to the working current in the main circuit 11 is 1; and when the working current in the main circuit 11 is less than the preset value, a ratio of the feedback signal output from the third acquisition module to the working current in the main circuit 11 is less than 1.

Specifically, when the second acquisition module 22 acquires the output signal at the signal output terminal OUT, and outputs the ramp signal based on the output signal; the comparison module 30 compares a superposed signal of the ramp signal and the feedback signal with the acquisition signal, and outputs a comparison signal via the comparison output terminal Cout; the pulse width modulation module 40 receives the comparison signal and generate a control signal of corresponding duty cycle based on the comparison signal so as to control the first MOS transistor M1 and the second MOS transistor M2. Wherein when the working current in the main circuit 11 is greater than a preset value, a ratio of the feedback signal output from the third acquisition module 23 to the working current in the main circuit 11 is 1; and when the working current in the main circuit 11 is less than the preset value, a ratio of the feedback signal output from the third acquisition module to the working current in the main circuit 11 is less than 1.

Furthermore, the preset value is 25% to 95% of a rated value of the working current in the main circuit 11, for instance, the preset value may be 35%, or 40%, or 45%, or 55%, or 60%, or 65%, etc. of a rated value of the working current in the main circuit 11, and preferably, the preset value is half of a rated value of the working current in the main circuit.

Furthermore, if the working current in the main circuit 11, collected by the third acquisition module 23, is more than half of that of the rated value, it can be considered that the overcurrent protection is required in the main circuit 11. For the continuously declining working current, a ratio of the feedback signal to the working current in the main circuit 11 is less than 1, that is, the feedback signal may also decline, such that the duty cycle of the pulse signal may increase, and the speed of the transient response increases as well; when the working current tends to be stable, restoring the ratio of the feedback signal to the working current in the main circuit to be 1.

It should be noted that the specific ratio of the feedback signal to the working current in the main circuit 11 may either be a fixed coefficient value of less than 1, or a varying and increasing coefficient value.

In a preferred embodiment, the first acquisition module 21 comprises:

an error amplifying unit gm for amplifying the output signal after comparing the acquired output signal and a preset reference signal Vref; and a voltage regulating unit, an input terminal of the voltage regulating unit is connected to an output port of the error amplifying unit gm for regulating a voltage of an amplified signal generated from the error amplifying unit 21, and thereby forming the acquisition signal.

Figure 2:
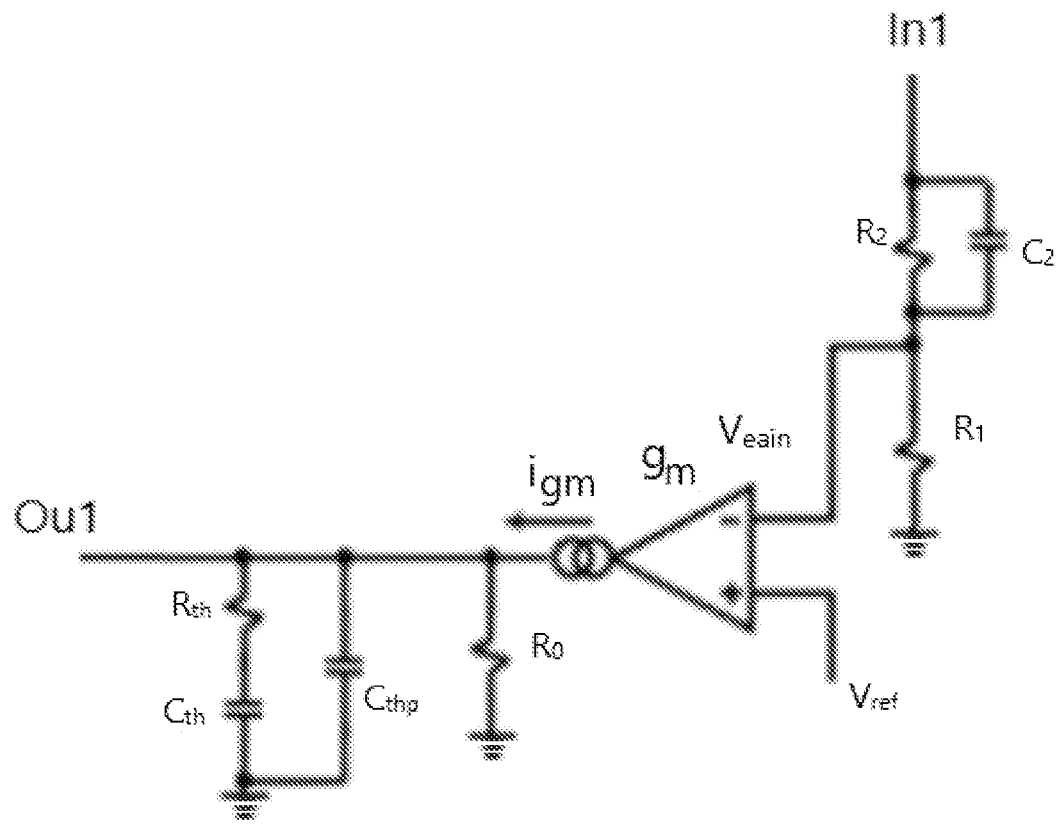
FIG. 2 is a schematic circuit diagram of a first acquisition module in a transient response circuit of a switching regulator according to an embodiment of the present invention.

Specifically, as shown in FIG. 2, the acquired output signal enters through an input port In1; after entering, the output signal may forms the voltage Veain entering the negative phase input terminal of the error amplifying unit gm through a voltage dividing unit; the voltage dividing unit shown in FIG. 2 is composed of a resistor R1 and a resistor R2, wherein the resistor R1 is connected in series with the resistor R2, and the resistor R2 may be connected in parallel with a capacitor C2, one end of the resistor R1 at which the resistor R2 is not connected with can be grounded, then the acquisition signal outputs from the output port Ou1 after perform the voltage regulating operation.

In a preferred embodiment, the voltage regulating unit comprises a first compensation capacitor Cth, a second compensation capacitor Cthp, and a compensation resistor Rth;

wherein the first compensation capacitor is connected in series with the compensation resistor before it is connected in parallel with the second compensation capacitor.

Specifically, as shown in FIG. 2, the capacitance values of the first compensation capacitor Cth and the second compensation capacitor Cthp may be different; and the voltage regulating unit may further comprises a resistor R0 grounded at one end.

In a preferred embodiment, the voltage reduction module 10 comprises an induction resistor Rsense connected in series with the main circuit 11;

the third acquisition module 23 acquires an induced voltage on the induction resistor Rsense, and multiplying the induced voltage by a feedback coefficient to generate the feedback signal.

Figure 3:
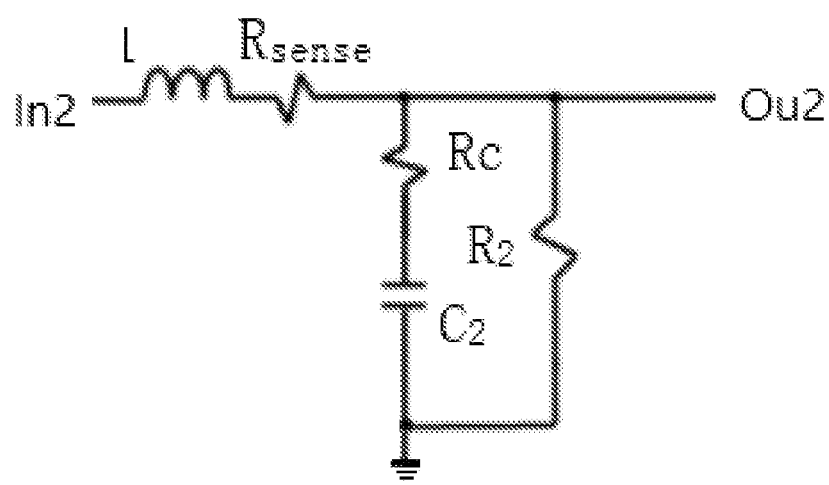
FIG. 3 is a schematic circuit diagram of a main circuit in a transient response circuit of a switching regulator according to an embodiment of the present invention.

Specifically, as shown in FIG. 3, the input signal inputting from the signal input terminal INT passes through the first MOS transistor M1 first, and enters the main circuit 11 through the input port IN2 of the main circuit 11, then passes through a rectifying inductor L before outputting through the output port Ou2; the induction resistor Rsense may be connected in series the rectifying inductor L, following the rectifying inductor L.

Figure 4:
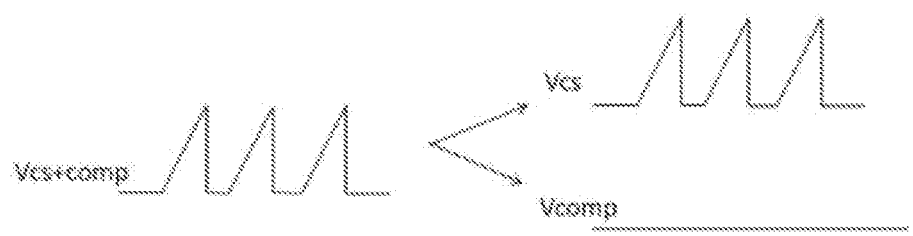
FIG. 4 is a schematic exploded view of a superimposed signal of a transient response circuit of a switching regulator according to an embodiment of the present invention.
Figure 6:
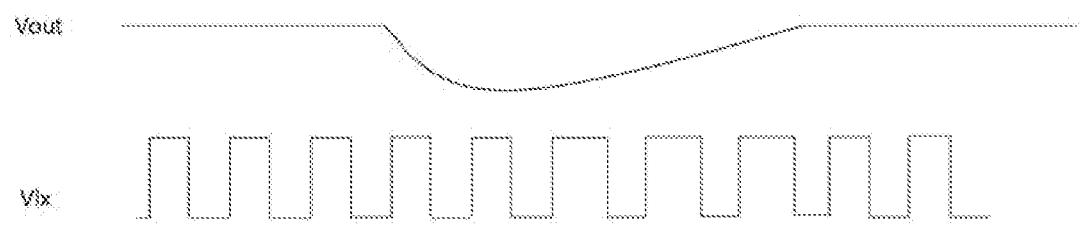
FIG. 6 is a schematic diagram showing an output waveform of a transient response circuit of a switching regulator according to an embodiment of the present invention.

In a preferred embodiment, as shown in FIG. 4, Vcs in FIG. 4 represents the waveform of the feedback signal, Vcomp represents the waveform of the flat-wave signal, thus, Vcs plus Vcomp represents the waveform of the superposed signal of Vcs and Vcomp, and the effect on the signal output terminal OUT may be as shown in FIG. 6; it can be seen from FIG. 6, when the output signal Vout falls below a certain value, the duty cycle of the control signal Vlx is significantly improved, thus, the transient response becomes faster until the output signal Vout recovers stably.

Figure 5:
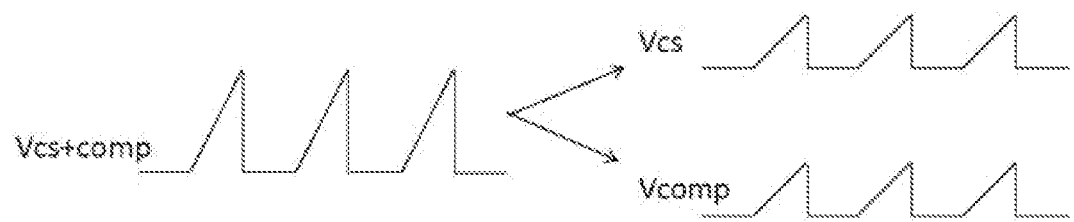
FIG. 5 is a schematic exploded view of another superimposed signal of a transient response circuit of a switching regulator according to an embodiment of the present invention.

In another preferred embodiment, as shown in FIG. 5, the VCS in FIG. 5 represents the waveform of the ramp signal, Vcomp represents the waveform of the feedback signal, wherein the amplitude of the feedback signal has grown sharply, such that the duty cycle of the pulse signal may increase to ensure a fast and efficient transient response process; as shown in FIG. 6, VEAO in FIG. 6 represents the waveform of the comparison signal output from the comparison module 30, Vlx represents the waveform of the duty cycle of the pulse signal. Moreover, since the duty cycle keeps increasing, a value of the comparison signal output from the comparison module 30 increases continuously and rapidly.

In conclusion, the present invention provides a transient response circuit of a switching regulator, which has the advantages of excellent transient response, quick response, and high reliability.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A transient response circuit of a switching regulator, comprising:
    a voltage reduction module, comprising:
    a signal input terminal for receiving an input signal and a signal output terminal for outputting an output signal;
    a main circuit connected in series with the signal input terminal and the signal output terminal;
    a first MOS transistor and a second MOS transistor for controlling on and off state of the main circuit;
    a first acquisition module, connected to the signal output terminal, configured to acquire the output signal from the signal output terminal, and configured to output an acquisition signal based on the output signal;
    a second acquisition module, connected to the signal output terminal, configured to acquire the output signal from the signal output terminal, and configured to output a gating signal based on the output signal, wherein the gating signal comprises a ramp signal and a flat-wave signal;
    a third acquisition module, configured to acquire working current on the main circuit in the voltage reduction module and output a feedback signal;
    a comparison module, comprising:
    a positive phase input terminal, connected to the first acquisition module, and configured to receive the acquisition signal;
    a first negative phase input terminal, connected to the second acquisition module, and configured to receive the gating signal;
    a second negative phase input terminal, connected to the third acquisition module, and configured to receive the feedback signal;
    a comparison output terminal;
    wherein the comparison module compares a superposed signal of the flat-wave signal or the ramp signal and the feedback signal with the acquisition signal, and configured to output a comparison signal via the comparison output terminal;
    a plurality of pulse width modulation modules, connected to the comparison output terminal, the first MOS transistor, and the second MOS transistor, respectively, and configured to receive the comparison signal and generate a control signal of corresponding duty cycle based on the comparison signal so as to control the first MOS transistor and the second MOS transistor;
    wherein the second acquisition module outputs the ramp signal when the acquired output signal is greater than a preset value, and outputs the flat-wave signal when the output signal is less than the preset value; or
    when the working current obtained from the main circuit is greater than a preset value, a ratio of the feedback signal output from the third acquisition module to the working current of the main circuit is 1; and when the working current obtained from the main circuit is less than the preset value, a ratio of the feedback signal output from the third acquisition module to the working current of the main circuit is less than 1.

2. The transient response circuit as claimed in claim 1, wherein a level of the flat-wave signal is 0.

3. The transient response circuit as claimed in claim 1, wherein the preset value is 25% to 95% of a rated value of the working current of the main circuit.

4. The transient response circuit as claimed in claim 1, wherein the preset value is half of a rated value of the working current of the main circuit.

5. The transient response circuit as claimed in claim 1, wherein the first acquisition module comprises an error amplifying unit for amplifying the output signal after comparing the acquired output signal and a preset reference signal.

6. The transient response circuit as claimed in claim 1, wherein the first acquisition unit comprises a voltage regulating unit, an input terminal of the voltage regulating unit is connected to an output port of the error amplifying unit for regulating a voltage of an amplified signal generated from the error amplifying unit, and thereby forming the acquisition signal.

7. The transient response circuit as claimed in claim 6, wherein the voltage regulating unit comprises a first voltage regulating capacitor, a second voltage regulating capacitor, and a voltage regulating resistor;

wherein the first voltage regulating capacitor is connected in series with the voltage regulating resistor before it is connected in parallel with the second voltage regulating capacitor.

8. The transient response circuit as claimed in claim 1, wherein the voltage reduction module comprises an induction resistor connected in series with the main circuit;

the third acquisition module acquires an induced voltage on the induction resistor, and multiplying the induced voltage by a feedback coefficient to generate the feedback signal.

9. The transient response circuit as claimed in claim 1, wherein both the first MOS transistor and the second MOS transistor are NMOS transistors.

\* \* \* \* \*